United States Patent [19]

Huber

[11] Patent Number: 5,422,006

[45] Date of Patent: Jun. 6, 1995

[54] UNDERWATER CLEARING DEVICE FOR ROUND SEWAGE TREATMENT BASINS

[76] Inventor: Hans G. Huber, Zum Rachental 8, D-93445 Berching, Germany

[21] Appl. No.: 190,141

[22] PCT Filed: Jul. 9, 1993

[86] PCT No.: PCT/EP93/01795

§ 371 Date: Feb. 3, 1994

§ 102(e) Date: Feb. 3, 1994

[87] PCT Pub. No.: WO94/01191

PCT Pub. Date: Jan. 20, 1994

[30] Foreign Application Priority Data

Jul. 9, 1992 [DE] Germany .................. 42 22 559.0

[51] Int. Cl.$^6$ .................................................. B01D 21/18
[52] U.S. Cl. ...................... 210/524; 210/528; 210/530
[58] Field of Search ............. 210/523, 524, 525, 528, 210/530

[56] References Cited

U.S. PATENT DOCUMENTS

| | | | |
|---|---|---|---|
| 1,972,584 | 9/1934 | Easterday | 210/55 |
| 2,506,927 | 5/1950 | Kelly | 210/530 |
| 3,084,801 | 4/1963 | Bonnin | 210/528 |
| 3,465,886 | 9/1969 | Pilarczyk | 210/520 |
| 4,005,019 | 1/1977 | Parlette | 210/525 |
| 4,594,156 | 6/1986 | Grujanoc et al. | 210/528 |
| 4,859,346 | 8/1989 | Wood | 210/530 |

FOREIGN PATENT DOCUMENTS

| | | |
|---|---|---|
| 43241 | 3/1910 | Austria . |
| 8109945 | 9/1981 | German Dem. Rep. . |
| 1015411 | 9/1957 | Germany . |
| 2160194 | 6/1973 | Germany . |
| 2551907 | 12/1976 | Germany . |
| 3135215 | 11/1983 | Germany . |
| 3540606 | 5/1987 | Germany . |
| 57-37368 | 8/1982 | Japan . |
| 502469 | 3/1939 | United Kingdom . |

Primary Examiner—Christopher Upton
Attorney, Agent, or Firm—Hopkins & Thomas

[57] ABSTRACT

An underwater clearing device for round sewage treatment basins having an approximately radially extending clearing device formed as a rake blade (8) that is revolvingly driven and sweeps along the bottom (2) of the round sewage treatment basin. The drive of the rake blade (8) being coupled to the rake blade (8) radially on the outside or radially on the inside via a toothed ring (11) provided solely for the revolving movement of the rake blade (8). The rake blade (8) and frame (10) forming a unit arranged under water. A driven transverse conveyor (31) may be provided instead of rake blade.

20 Claims, 8 Drawing Sheets

UNDERWATER CLEARING DEVICE FOR ROUND SEWAGE TREATMENT BASINS

FIELD OF THE INVENTION

The invention is related to an underwater clearing device for round sewage treatment basins with an approximately radially extending clearing device that is revolvingly driven and sweeps along the bottom of the round sewage treatment basin. Such round sewage treatment basins are used in particular in the sewage treatment technology for causing a sedimentation of the sludge and to draw off the effluent treated in this way using a channel arranged in the region of the water level. The sedimented sludge is transported into a centrally arranged, funnel-shaped sludge discharge, which is connected to a discharge pipe via a pump or the like, by an underwater clearing device.

BACKGROUND OF THE INVENTION

An underwater clearing device of the type described above is known from the German Patent Application 25 51 907. The round sewage treatment basin is spanned by a bridge arranged in a fixed position, which is supported on the crown of the basin. Assemblies consisting of two concentric hollow cylinders are suspended from the stationary bridge, carried by a central support- and guide-bearing. From the outer hollow cylinder jib booms radially extend, from which rake blades are suspended, which sweep along close to the bottom and are supported by support wheels. A motor with a driving pinion is supported on the stationary bridge, the driving pinion working together with a toothed ring on the outer cylinder. By way of the cylinder-shaped assemblies the actuation also of the rake blades is centrally effected. The rake blades may be formed to partially extend into the funnel-shaped sludge discharge.

It is an advantage of this known underwater clearing device that the crown of the basin is not stressed alternatingly and by a rotating bridge, but only through the fixed support of the stationary bridge. The flow through the hollow-cylindrical assemblies is improved. A disadvantage is the elaborate bridge with its support as well as a certain influencing of the flow in the round sewage treatment basin by the cylinder-shaped assemblies.

From the German Offenlegungsschrift 35 40 606 an underwater clearing device with a rotating bridge is known, which is supported on the crown of the basin. The rake blades are suspended from the bridge by struts in a radial inside region, so that the drive of the bridge simultaneously drives the rake blades. In this way the motor and the other aggregates, as for instance a transmission, are advantageously placed above and therefore out of the water. A central pillar is provided, on which the bridge is additionally supported. This type of underwater clearing device with a revolving bridge is very elaborate. It leads to damages of the crown of the basin, especially since it has to be large and heavy. For instance, the bridge has to able to withstand the pressure of the wind and nevertheless function properly. A disadvantage is the central pillar, which has to be built separately in the round sewage treatment basin. The drain for the waste water is provided inside the central pillar. The presence of the central pillar influences the flow in the round sewage treatment basin. Furthermore, the struts for the suspension of the rake blades from the bridge are necessarily led over the complete level of the water and influence the flow in the round sewage treatment basin negatively. A certain stirring action takes place, which has the consequence of a disadvantageous whirl-up. Because of the protruding struts, only a small part of the round sewage treatment basin can be used for the arrangement of packets of lamellas.

SUMMARY OF THE INVENTION

It is the object of the invention to provide an underwater clearing device of the type described above, which needs neither a bridge nor a central pillar, and which therefore avoids the disadvantages connected with these. The new underwater clearing device is meant to enable an especially even removal of the sludge without any whirling-up.

According to the invention this is realized with the underwater clearing device of the type described above in that the clearing device is provided in the form of a rake blade, the drive of which is coupled to the rake blade radially on the outside or radially on the inside via a toothed ring provided solely for the revolving movement of the rake blade, where the rake blade and a frame assigned thereto form a unit arranged under water.

The invention is based on the idea to do without the arrangement and formation of a bridge and an elaborate central pillar and to use instead only parts which are below the surface of the water. The rake blade is fortified by a frame assigned to it and a toothed ring is used by which the drive is applied. The toothed ring may contact or be arranged radially on the outside or radially on the inside of the rake blade, with the possibility that the toothed ring either may be a part of the frame, i.e. be arranged at the frame and revolve with it, or it may be a part of the round sewage treatment basin, i.e. be provided and arranged in a fixed position on this.

For the underwater clearing device according to the invention a bridge and a central pillar are abolished. The wall of the basin in the region of the basin crown is also kept free from stress in this way. With the possible exception of the drive motor all parts are submerged in the water, so that for instance the wind pressure cannot act disadvantageously anymore. The formation of the frame may be dimensioned much smaller than for a revolving bridge. The drive to be used may also be formed to be correspondingly smaller. The underwater clearing device according to the invention has the further advantage that it disturbs the flow in the round sewage treatment basin on minimally and therefore does not hinder the sedimentation. Since the frame and the rake blade as well as the toothed ring are in one plane next to the bottom of the basin, a free space is created, which may be used e.g. for the arrangement of lamellas and other assemblies. The new underwater clearing device, with respect to its construction, is suitable for small, medium, and very large diameters of the round sewage treatment basin.

The frame supporting the rake blade may be formed sector-like and it may extend in an essentially horizontal or inclined plane parallel to the bottom of the basin. When the drive happens radially from the outside, then the sector-like frame is arranged in the usual direction corresponding to the division of the round sewage treatment basin area. When on the other hand the drive happens radially on the inside, then the sector-like formation and arrangement of the frame is provided opposite to the sectors of the round sewage treatment basin. The new underwater clearing device can be applied advantageously even when the round sewage treatment basin is built with a horizontal bottom. Then the building of such a round sewage treatment basin is considerably simplified. An otherwise often necessary lowering of the ground-water level is avoided in this way.

The sector-like frame may be led and supported radially on the outside, i.e. the drive happens radially in an outer region, so that the toothed ring used has a diameter approximately corresponding to the diameter of the round sewage treatment basin. Such an arrangement with a radial outer drive is advantageous, when for example the drive motor is arranged in a fixed position, so that on the one hand the toothed ring has a large diameter, but on the other hand becomes a part of the frame and therefore adds to its fortification.

The sector-like frame may also be led and supported radially on the inside. This has the advantage that the toothed ring has a relatively small diameter. This holds for the arrangement of the toothed ring in a fixed position, as well as for a revolving arrangement.

The toothed ring may be arranged on the frame of the rake blade and therefore revolving, and a motor with a driving pinion may be provided in a fixed position in the area of the wall of the basin or in the central area of the round sewage treatment basin. The opposite arrangement is also possible. The toothed ring is then provided in a fixed position at the round sewage treatment basin, and a motor with a driving pinion is arranged on the frame and therefore revolving. In this case the current supply is provided via a slip ring contact. When the drive motor is arranged in a fixed position there is the possibility of an arrangement in a fixed position under water, so that no problems in the current supply arise and that all parts of the underwater clearing device are arranged below the surface of the water.

A rail may be provided in a fixed position radially on the outside or inside in the area of the bottom of the basin, at which and on which the frame with the rake blade is supported. The support on the rail is best accomplished with a number of flanged wheels, which are suited for the acceptance and transfer of horizontal as well as vertical forces.

The rake blade may be divided into a number of partial rake blades, which are arranged slanted with respect to the direction of motion and mutually overlapping on the frame. For this the formation of the frame under water is advantageously used to divide the rake blade into a number of partial rake blades, so that there is the possibility of a slanted arrangement, which is not possible for a radially continuous rake blade. The effect of this is a spiral transport, i. e. the sludge is transported towards the center of the round sewage treatment basin during the rotation of the partial rake blades. The same effect can be attained, when the rake blade is replaced or supported by a screw conveyor, which is arranged on the frame radially to the center axis of the round sewage treatment basin. The conveyor shaft with the conveyor helix of the screw conveyor is driven, and the drive can be realized by the drive of the frame. In connection with such embodiments the conical formation of the bottom of the basin becomes unnecessary, because the force component directed towards the inside is provided by the slanted arrangement of the partial rake blades.

The rake blade or the partial rake blades may be supplemented or replaced by suction cones, by which the removal of the sludge is performed centrally through a discharge duct arranged there. These suction cones are bell-shaped suction devices, with the aid of which the sedimented sludge is taken up and removed during the movement of the underwater clearing device. A combination of partial rake blades and suction cones is also possible. Then there is no need for a conical funnel in the central area of the round sewage treatment basin, and the bottom of the basin can advantageously be formed to be horizontally continuous.

The frame and the rake blade with respect to the partial rake blades may be provided in a double arrangement symmetrical to a plane through the center axis of the round sewage treatment basin. Then two arms protrude in a symmetric fashion. The device is balanced with respect to its weight; the support is simplified. The underwater clearing device may then be driven with half the rotational frequency.

According to the invention a driven transverse conveyor, which is arranged radially and continuously in the round sewage treatment basin and which has a casing with a conveyor helix arranged therein, and the casing is formed to be open in the direction of rotation of the transverse conveyor by the formation of an intake opening for the sludge and which is provided with a preferably at least partially elastically formed receiving blade for the sludge, may be provided as the underwater clearing device of the type described above.

It is based on the idea to fashion the clearing device not as a passive rake blade, but as an active, i.e. driven transverse conveyor, which transfers its drive energy to the sedimented sludge taken up and which thereby ensures that the sludge may be removed more evenly and specifically. Such an even removal of the sludge happens even when the sedimentation of the sludge in the round sewage treatment basin is uneven, i. e. when in a radial direction locally different or high deposit quantities of sludge are to be removed. By fashioning the device as a transverse conveyor in a special way, that is with a casing and a conveyor helix arranged therein, a removal of the sludge results, for which the whirling-up of the sludge by the transverse conveyor rotating in the round sewage treatment basin is greatly reduced compared to a bladed arrangement. The settled sludge is captured by the casing of the transverse conveyor and transported away and down by the conveyor helix. The conveyor helix may—for reasons of weight—also be formed as a shaftless conveyor helix. The new underwater clearing device can also be used—even retrofitted—for round sewage treatment basins which have funnel-shaped inclined bottoms. But it has the special advantage—especially when newly building a round sewage treatment basin—that the bottom of the basin can be horizontally even, by which the costs of the round sewage treatment basin are greatly reduced and a penetration into the ground-water can under some circumstances be avoided. A central pillar is also advantageously abolished. The removal of the sludge may happen radially inside, i.e. in the central area of the round sewage treatment basin, if the transverse conveyor is formed and driven to convey radially towards the center. There is also the possibility, though, to arrange the transverse conveyor to work radially towards the outside, so that a central removal of the sludge is not necessary and the round sewage treatment basin is simplified in its central area. It is sensible to combine the transverse conveyor with a frame, from which it is suspended, the frame also being under water. The frame itself has to have the necessary support in the round sewage treatment basin and also a corresponding drive.

It is also possible, though,—especially with existing round sewage treatment basins having a bridge—to suspend the transverse conveyor from the frame of the bridge to use the bridge as a frame.

The casing of the transverse conveyor may be guided at a spaced distance from the bottom of the basin, this distance then being bridged by the receiving blade. In this way the casing of the transverse conveyor does not come into contact with the bottom of the basin, only the receiving blade, across which the sludge is lifted by the principle of the inclined plane, the sludge subsequently entering the inside of the casing through the entrance opening. The receiving blade is immediately connected to the lower edge of the entrance opening of the casing. The receiving blade is wholly or at least partially fashioned to be elastic or provided with elastic parts, so that uneven places of the bottom of the basin can be compensated.

It is useful to provide a separate drive for the transverse conveyor, in addition to the drive of the frame. This is sensible, since the transverse conveyor is usually driven with a higher rotational frequency than the frame itself, which revolves relatively slowly in the round sewage treatment basin. In principle the possibility to obtain both drives from a common source is given, though.

The casing of the transverse conveyor has the continuous entrance opening in any case. On its rear side, that is, the side opposite the direction of motion, the casing of the transverse conveyor may be formed as a sieve area. If the perimeter of the casing encloses an angle of 270°, i. e. if the opening has an angle of 90°, there is the possibility to use a major part of the casing as a sieve area. The sludge is pressed against this sieve area by the water pressure resulting from the revolving movement of the transverse conveyor in the round sewage treatment basin and it is simultaneously moved along the sieve area by the conveyor helix. This results in a certain dehydration effect of the sludge. This dehydration effect is welcome, since a sludge as dry as possible is to be removed. The sludge has a very high water content anyhow. The sieve area has to be fashioned as a closed mesh. The sieve area may have openings with a slit width of up to 0.5 mm, preferably 0.1 mm, where the openings may be formed as round holes or as slits.

A rubber lip sweeping along the bottom of the basin may be provided on the receiving blade, by which tolerances in the course of the bottom of the basin are equalized, it is also possible, though, to do without such an elastic formation and instead ensure that a rigid receiving blade is adjusted so that it does not touch the concrete bottom of the basin in any place during its rotational cycle. A sedimented sludge that is not taken up by the receiving blade will remain in the round sewage treatment basin. This is not disadvantageous, though.

When the transverse conveyor transports radially towards the inside, it is possible to arrange a pump for the removal of the sludge taken up by the transverse conveyor on the radially inner end of the transverse conveyor. Then a funnel, as it is known to be used, in the central area of the round sewage treatment basin is unnecessary. The sludge taken up by the transverse conveyor is then directly transported upwards by the pump and carried away by a sludge discharge without an intermediate storage in a funnel.

The drive of the transverse conveyor may be derived from the drive of the frame. Usually a transmission is interconnected in order to adjust to each other the different speeds of rotation for the rotation of the transverse conveyor in the round sewage treatment basin on the one hand and the drive of the conveyor helix of the transverse conveyor on the other hand.

It is also possible that the transverse conveyor is driven to transport sludge radially towards the outside of the basin and a pump for the removal of the sludge taken up by the transverse conveyor is arranged on the radially outer end of the transverse conveyor. Then the central pillar of the round sewage treatment basin can be fashioned even simpler. Usually only an inlet duct for the waste water to be treated will be provided. Due to the transport of the transverse conveyor radially towards the outside, the sludge can be taken over and removed on a relatively high level outside of the round sewage treatment basin. It is then useful if a channel to receive the sludge delivered by the pump surrounds the round sewage treatment basin.

BRIEF DESCRIPTION OF THE DRAWINGS

The invention is further explained and described with the aid of preferred embodiments. The Figures show.

DETAILED DESCRIPTION

Figure 1:
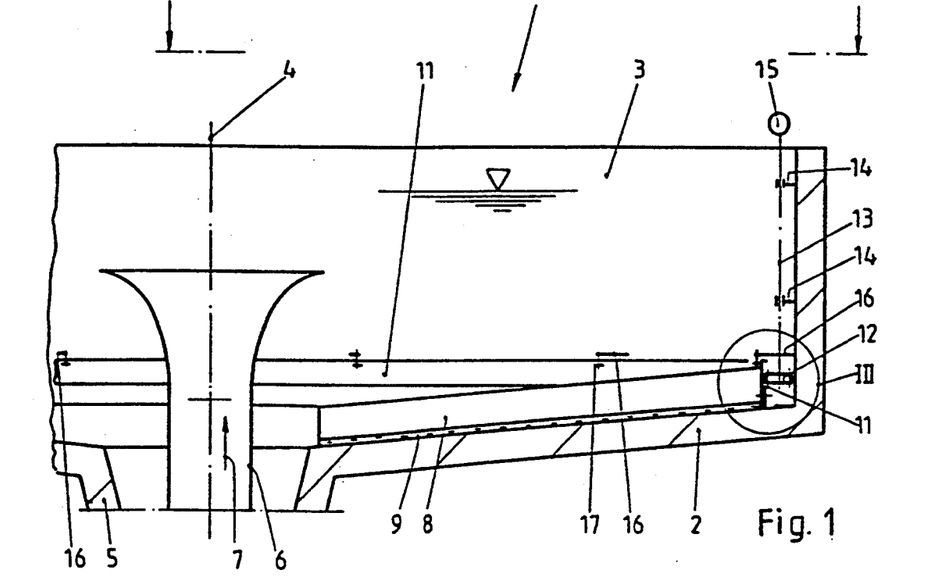
FIG. 1 a vertical cut through a round sewage treatment basin with a first embodiment of the underwater clearing device, FIG. 2 a top view of a portion of the round sewage treatment basin with the underwater clearing device according to FIG. 1, FIG. 3 an enlarged representation of detail III of FIG. 1, FIG. 4 a cut similar to FIG. 1, but of a second embodiment, FIG. 5 a top view of the round sewage treatment basin with the underwater clearing device according to FIG. 4, FIG. 6 an enlarged representation of detail VI in FIG. 4, FIG. 7 a vertical cut through a round sewage treatment basin with a further embodiment of the underwater clearing device, FIG. 8 a vertical cut through the underwater clearing device in an additional embodiment with a stationary drive positioned in the central area, FIG. 9 a top view according to the line IX—IX in FIG. 8, FIG. 10 a detail X of FIG. 8 in an enlarged representation, FIG. 11 a vertical cut trough an underwater clearing device with a revolving drive positioned in the central area, FIG. 12 a top view according to the line XII—XII in FIG. 11, FIG. 13 an enlarged representation of detail XIII from FIG. 11, FIG. 14 a vertical cut through a round sewage treatment basin with a first embodiment of the transverse conveyor, FIG. 15 a top view of a portion of the round sewage treatment basin with the transverse conveyor according to FIG. 14, FIG. 16 a cut through the transverse conveyor according to the line III—III in FIG. 14, FIG. 17 a cut similar to FIG. 14, but of an additional embodiment, and FIG. 18 a cut similar to FIG. 14, but of a further embodiment.

FIG. 1 shows a cut through a round sewage treatment basin 1 with a bottom 2 and a wall 3. The formation is rotationally symmetrical with respect to a vertical center axis 4. The bottom 2 of the basin is provided slightly inclined and merges into a funnel 5 in the central area, which is only partially shown here, and through which the sedimented sludge is ultimately removed from the round sewage treatment basin. Arranged coaxially to the center axis 4 there is an inlet duct 6 terminating below the surface of the water, through which the waste water laden with sediments is brought into the interior of the round sewage treatment basin 1 according to the arrow 7.

Figure 2:
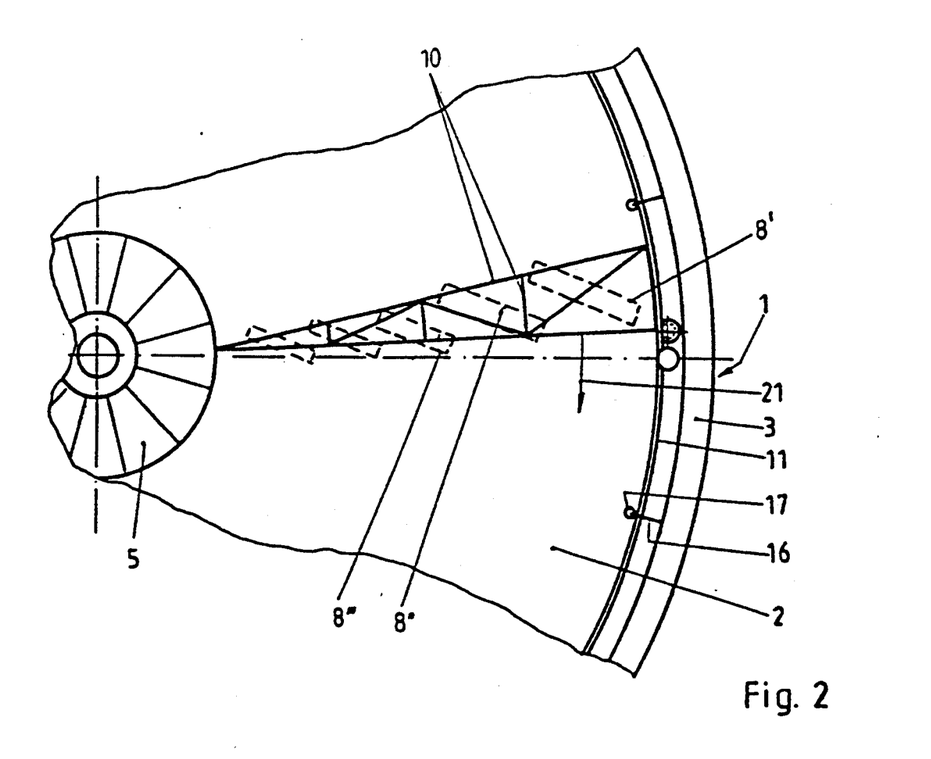

At least the major parts of the new underwater clearing device are arranged below the surface of the water. A rake blade 8, which may have a rubber lip 9, is provided. The rake blade 8 extends in a radial direction from an inner area approximately next to the funnel 5 radially towards the outside into the area of the wall 3. The rake blade 8 with its rubber lip 9 extends parallel to the bottom 2 of the basin, it is therefore also slightly inclined. A frame 10, which has a number of struts as shown in FIG. 2, is allocated to the rake blade 8. The frame 10 has an approximately triangular and in this case, i. e. with the drive on the outside, is arranged according to the division of the ground surface of the bottom 2 of the basin. A toothed ring 11 is solidly connected to the frame 10. It can be seen that the rake blade 8 as well as the frame 10 and the toothed ring 11 are provided in a compact arrangement with a small height far below the surface of the water in order not to disturb the flow and especially the sedimentation in the round sewage treatment basin 1 by their revolving motion.

Figure 3:
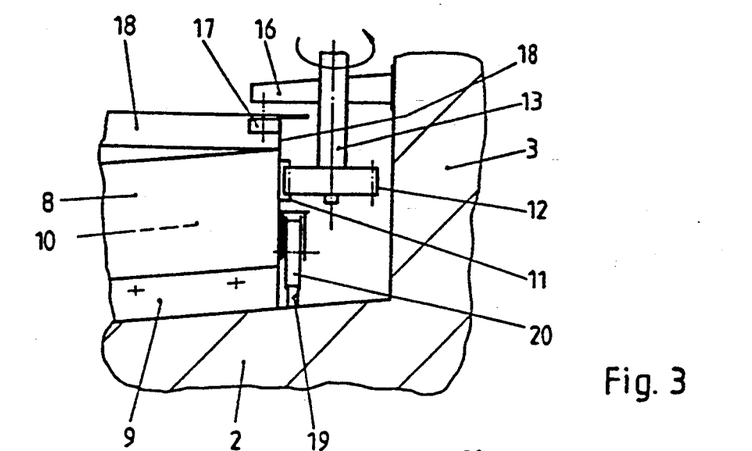

A driving pinion 12, which is located at the bottom end of a shaft 13 supported in bearings 14, meshes with the toothed ring 11. The bearings 14 are fixed to the inside of the wall 3 of the basin. A motor 15, which is only schematically shown here and which may especially be provided with a transmission, is located at the upper end of the shaft 13. Around the perimeter of the wall 3 of the basin further bearings 16 are provided at spaced apart distances, which have guide rollers 17 for the toothed ring 11 or profiles 18 connected thereto. Referring now to FIG. 3, a rail 19, on which at least two flanged wheels 20 are supported, which are borne on the outer side of the frame 10, is supported in a fixed position in a radially outer region on the bottom 2 of the basin. Together with this support and the guide rollers 17 the frame 10 obtains its stability, so that it is able to handle the moments arising during the revolving movement, when its rubber lip 9 sweeps along the bottom 2 of the basin. The revolving movement of the frame 10 with the rake blade 8 is directed downwards by the motor 15 and the shaft 13 and transferred to the toothed ring 11 by the driving pinion 12. Since the motor 15 is arranged in a fixed position and above the water level, the current supply is no problem. It is also possible, though, to do without the shaft 13 and to provide an underwater motor for the drive of the driving pinion 12. It can be seen from FIG. 1 that a considerably large free space is formed above the frame 10 and the toothed ring 11, which can be used for the accomodation of assemblies that favorably influence the sedimentation. It is understood that the rake blade 8 is driven to move very slowly, to keep the stirring effect as small as possible and on the other hand still cause the transport of the sedimented sludge radially from the outer side towards the inner side, and ultimately into the funnel 5. As shown by the broken line in FIG. 2, it is possible to further enhance the transport of the sludge by dividing the rake blade 8 into a number of partial rake blades 8', 8'' etc, in order to arrange these partial rake blades 8', 8'' etc. angled with respect to the direction of rotation according to the arrow 21. The arrangement should be such that neighboring partial rake blades 8', 8'' etc overlap in a radial direction.

Figure 4:
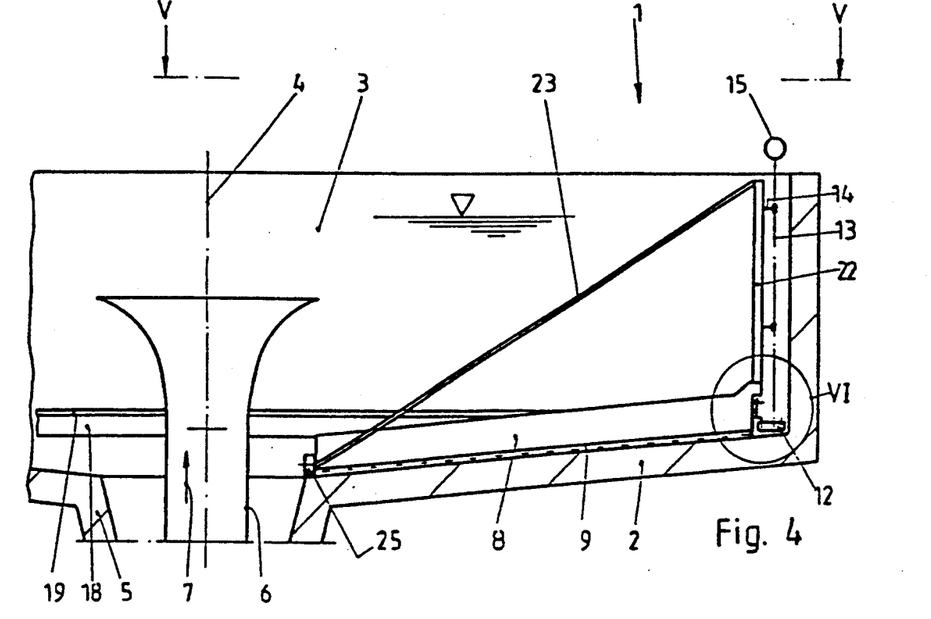
Figure 5:
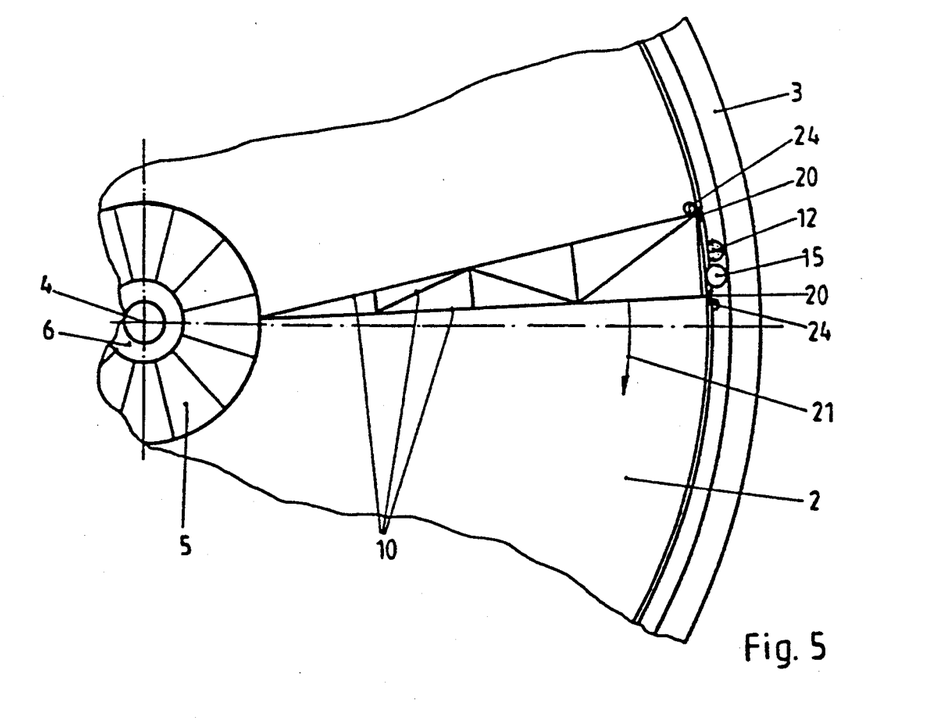
Figure 6:
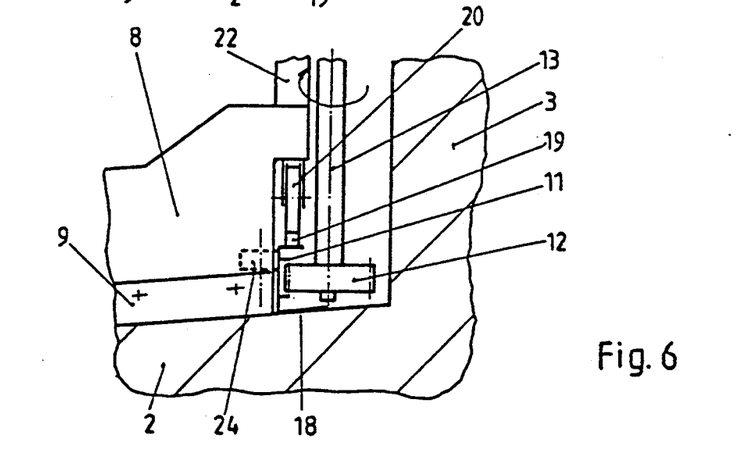

The embodiment of the underwater clearing device shown in the FIGS. 4 to 6 corresponds with the embodiment of the FIGS. 1 to 3 insofar as here, too, a drive on the outer side is realized. The frame 10 is also formed to be triangular and similarly arranged (FIG. 5). The toothed ring 11 is not part of the frame 10, though. The toothed ring 11 is provided in a fixed position on the profile 18 and is bolted to the bottom 2 of the basin. The frame 10 has a vertical support 22, which may be fortified and held by thin braces 23. The bearings 14 for the shaft 13, at the upper end of which here, too, the motor 15 is indicated, are now positioned on the vertical support 22 and therefore on the frame 10. The driving pinion 12 is connected to the lower end shaft 13, so that all of these parts revolve with the frame 10. The driving pinion 12 supports itself on the positionally fixed toothed ring 11. Guide rollers 24 serve to support the frame 10 on the profile 18. The profile 18 can at the same time be used to support the rail 19, on which the two flanged wheels 20 run. The rake blade 8 with the rubber lip 9 can be supported sweeping along the bottom 2 of the basin, due to the gravitational action. There is the possibility, though, to arrange an additional running wheel 25 (FIG. 4) at the radially inner end of the frame 10, in order to additionally support the rake blade 8 in this inner position.

Figure 7:
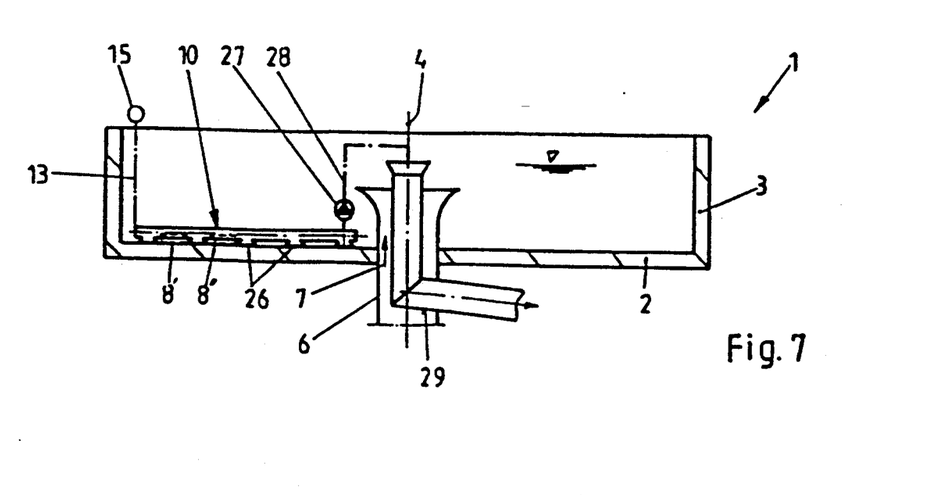

FIG. 7 shows in a schematic way an embodiment in which the frame 10 is at least partially occupied by suction cones 26, which are arranged on the frame 10 facing the surface of the bottom 2 of the basin. The arrangement is best so that the total surface of the bottom 2 of the basin is swept. With the aid of a pump 27 and a pressure pipe 28 the sucked-up sediment is removed via a discharge duct arranged concentric to the axis 4 and in a fixed position. The removal by vacuum according to the lifting principle may also be applied here. The revolving drive of the frame 10 may alternatively be brought about in two ways, which have already been described in connection with the embodiments of the FIGS. 1 to 3 with respect to FIGS. 4 to 6. The special advantage of this embodiment according to FIG. 7 is that the funnel 5 may be abolished and that the bottom 2 of the basin may be formed to be continuously straight. The construction of such a round sewage treatment basin is considerably easier than with an inclined bottom 2 and a connected funnel 5. A mixed construction using suction cones 26 as well as partial rake blades 8', 8'' etc. is also possible, as is shown by the broken lines in FIG. 7.

Figure 8:
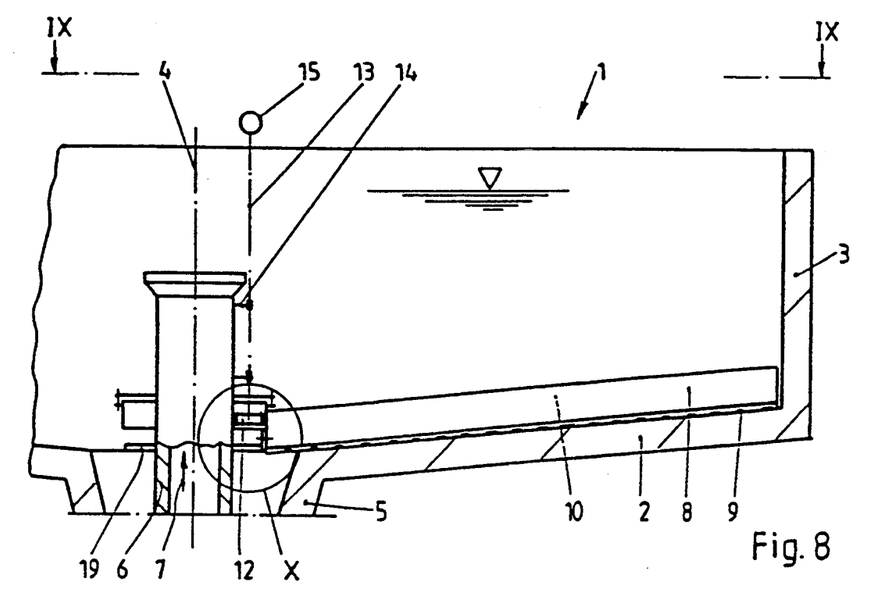
Figure 9:
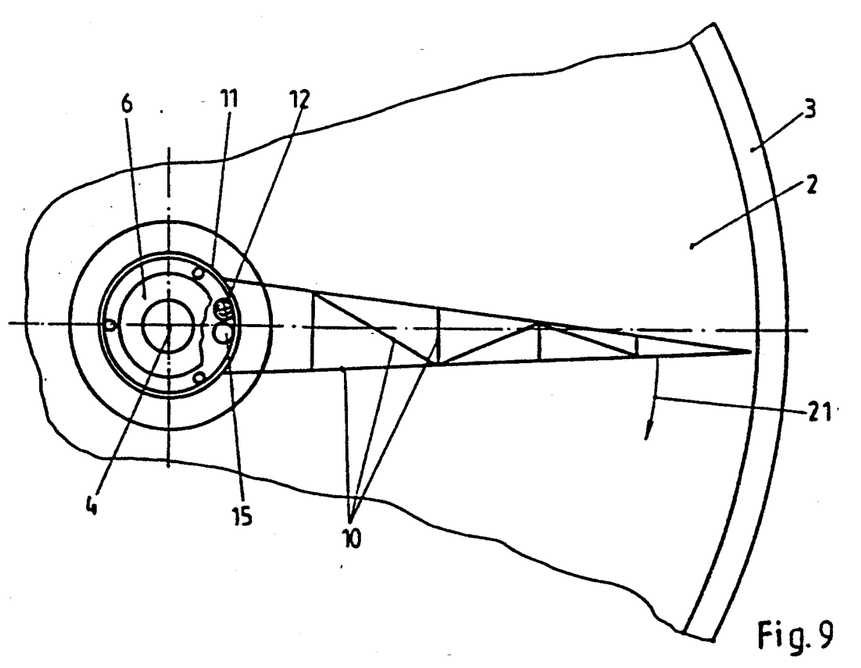
Figure 10:
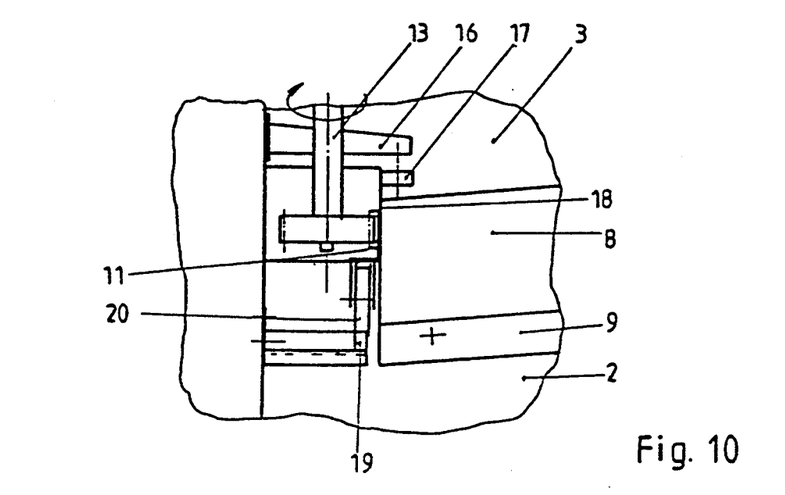

The embodiment of the FIGS. 8 to 10 shows the underwater clearing device with a drive positioned on the inner side, i.e. close to the center axis 4. This embodiment shows similarities with the embodiment according to the FIGS. 1 to 3, which has the drive arranged in a radially outer position. The stationary flange 19 extends around the inlet duct 6. The profile 18 is connected to the rake blade 8, the former supporting on its inner side the toothed ring 11 and which is otherwise supported by flanged wheels 20 on the rail 19. The bearings 16 support guide rollers 17, which can be arranged on the inner or outer side of the profile 18. The shaft 13 is held rotatably and in a fixed position relative to toothed ring 11 by the bearings 14, which in turn can be affixed to the inlet duct 6. The motor 15 is placed at the upper end of the shaft 13, while the lower end is provided with the driving pinion 12, which for reasons of clarity is shown displaced from the motor 15 in FIG. 9. In this case the frame 10 extends radially from the inside to the outside and it has, compared to the round sewage treatment basin 1, an inverted triangular shape, i.e. it has a width on the inner side and is pointed on the outer side facing away from axis 4.

It is advantageous when there is not only one rake arm with a frame 10 and a rake blade 8 (as shown), but a double arrangement in a symmetric construction. The common frame then extends diametrically over the whole round sewage treatment basin 1, and the two rake blades 8 are connected by the profile 18 and the toothed ring 11. This balancing of the weights simplifies the bearing of the underwater clearing device and the drive can happen with half the rotational frequency. The stirring effect, which is disadvantageous for the sedimentation, is comparatively more than halved. Such a balanced construction is also possible when the drive acts radially on the outer side.

Figure 11:
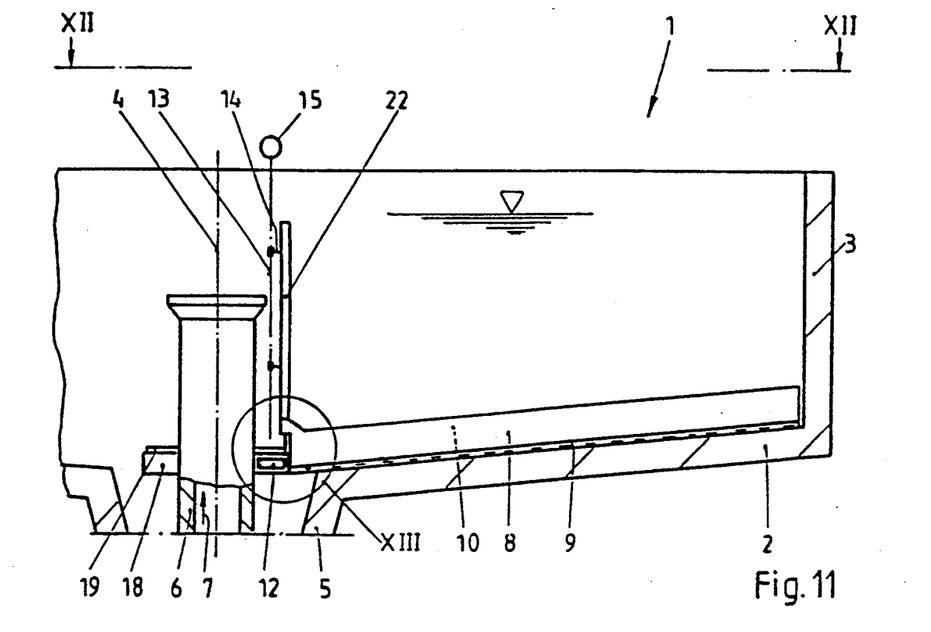
Figure 12:
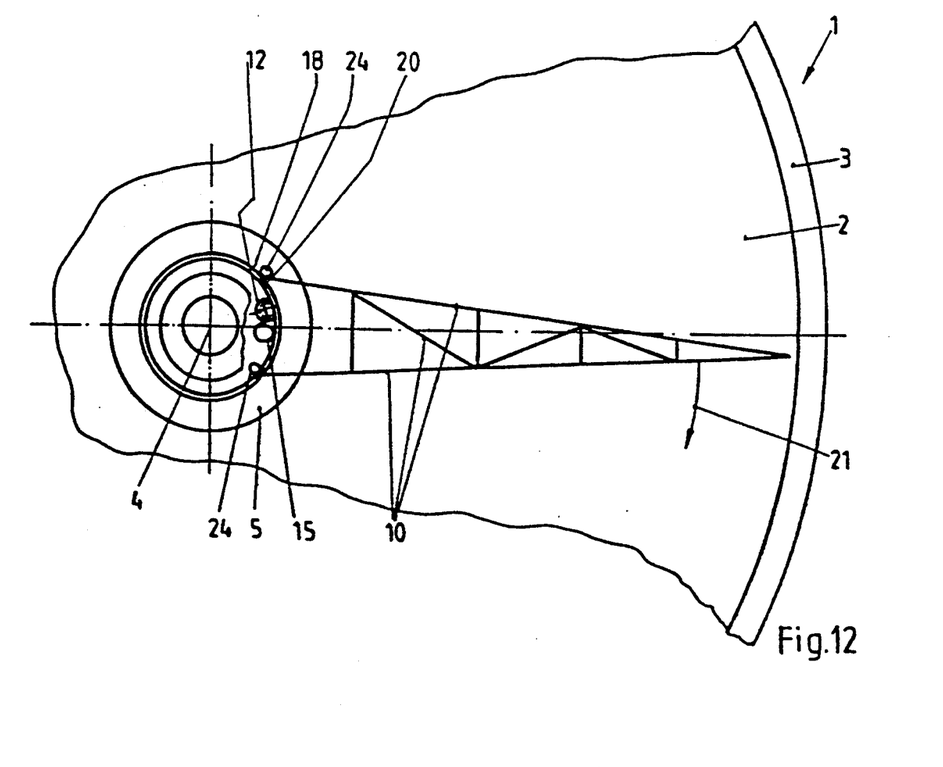
Figure 13:
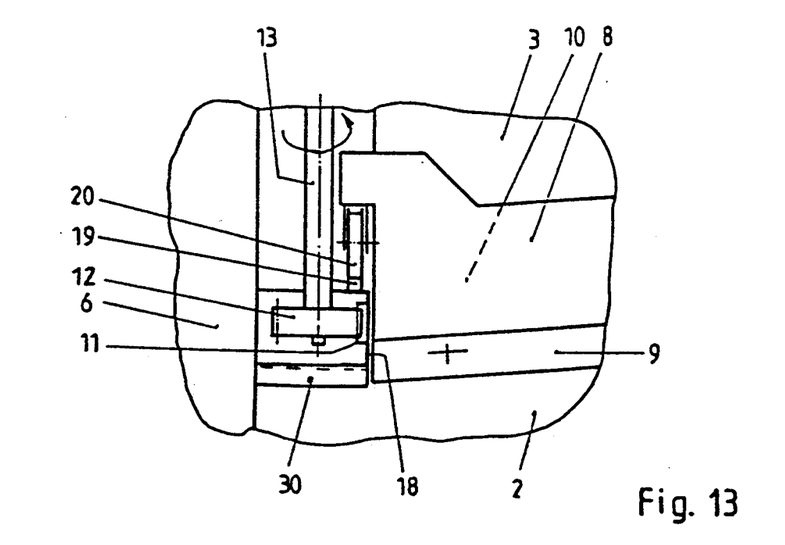

The embodiment of the FIGS. 11 to 13 also shows a drive on the inner side, which has a revolving motor 15, though. This embodiment is similar to the embodiment according to the FIGS. 4 to 6. A vertical support 22, which carries the bearings 14 for the shaft 13, rises from the frame 10. At the upper end of the shaft 13 the motor 15 is indicated, and at the lower end the driving pinion 12. The profile 18 is supported in a fixed position here, either at the inlet duct 6 with the aid of a number of consoles 30 (FIG. 13) or directly on the bottom 2 of the basin, when this is for instance horizontally continuously formed, as shown in FIG. 7. At the inner side of the profile 18 the toothed ring 11 is borne in a fixed position, which meshes with the driving pinion 12. The rail 19, on which flanged wheels 20 connected to the frame 10 travel, is also borne in a fixed position on the profile 18. The frame 10 is formed to be a fortified, low-built frame and arranged oppositely sector-shaped relative to the round sewage treatment basin 1, as previously depicted in the embodiment of FIGS. 8 to 10. A diameter-like, symmetric double arrangement with two rake arms is also possible.

It is understood that, even though the embodiment shown in the FIGS. 8 to 13 always is depicted to have a continuous rake blade 8 with a rubber lip 9, also partial rake blades can be used, which may be supplemented or replaced by suction cones 26 (FIG. 7). The pressure pipe 28, which is then necessary, can be supported very simply by the vertical support 22 (FIG. 11), so that the removal of the sedimented sludge can be carried out with a central discharge duct 29.

Figure 14:
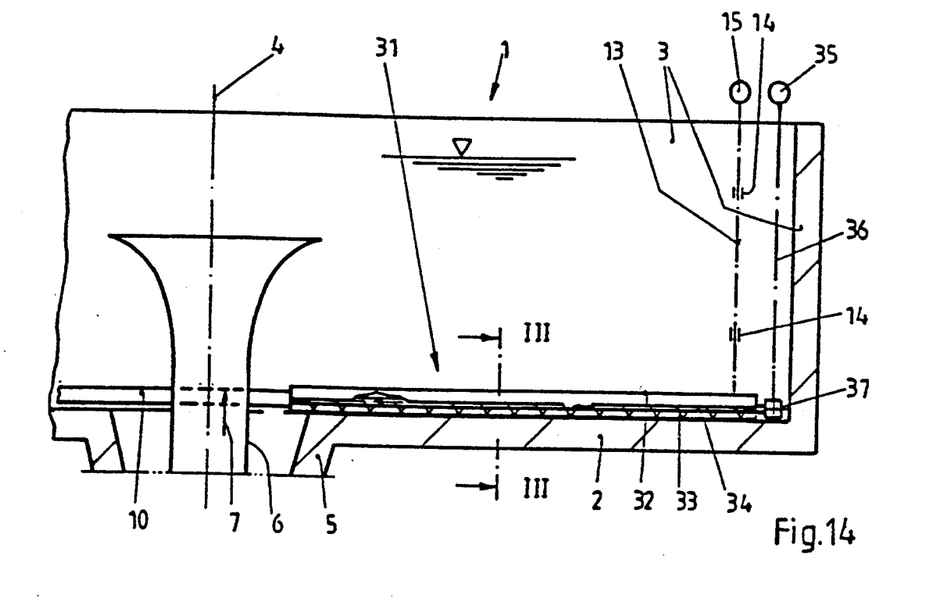
Figure 15:
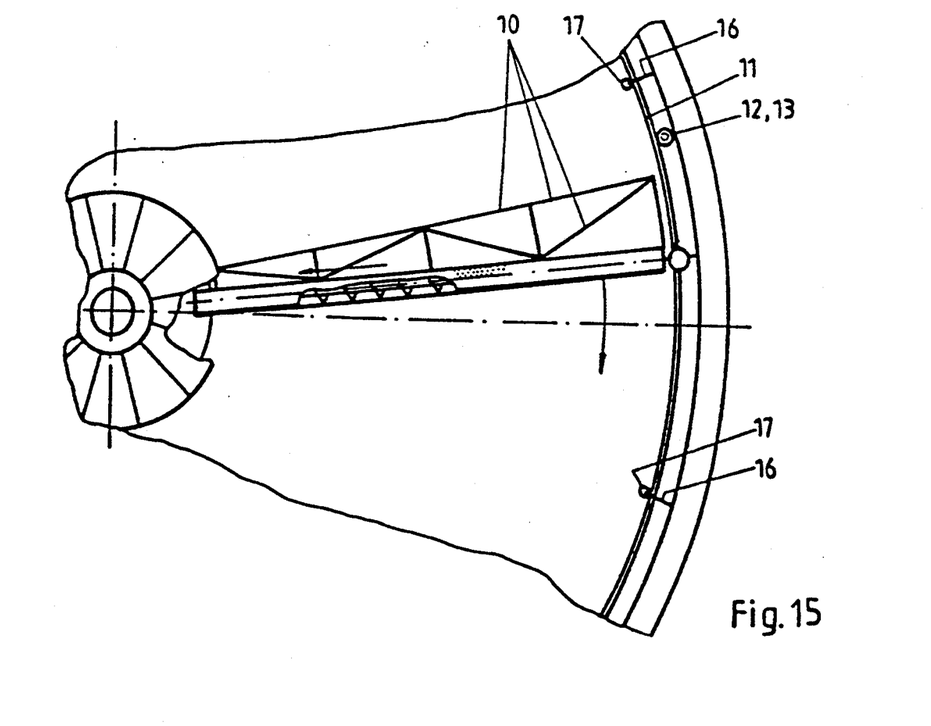

In the embodiment according to FIG. 14 a transverse conveyor 31 is connected to the frame 10 as the clearing device, the transverse conveyor 31 being provided continuing from the central area of the round sewage treatment basin towards the outside, and which therefore has a similar extension as the frame 10. The major components of the transverse conveyor 31 are a casing 32 and a conveyor helix 33, which is borne inside the casing 32. The conveyor helix 33 may be fitted to a shaft or it may be provided as a shaftless conveyor helix 33. A motor 35, which is provided at the outer end to revolve with the transverse conveyor 31 and the frame 10, serves as a drive for the transverse conveyor 31. The motor 35 has a shaft 36, which is shown only schematically in FIG. 14. The shaft 36 leads to a transmission 37, the output of which is solidly connected to the shaft 34 or a shaftless conveyor helix 33. The motor 35 and the shaft 36 as well as the transmission 37 are arranged revolving on the frame 10 in such a way that they can pass by the stationary motor 15 with the shaft 13 for the frame 10.

Figure 16:
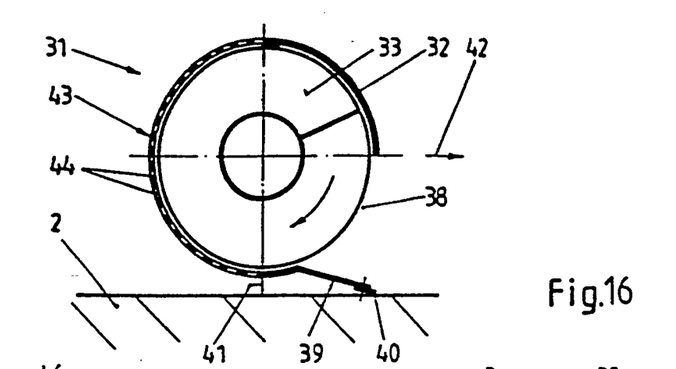

The design of the transverse conveyor 31 is explained especially according to the cross sectional depiction in FIG. 16. The casing 32 of the transverse conveyor 31 extends approximately over an angle of 270°, so that a correspondingly large intake opening is formed, Which is provided radially continuously from the inner to the outer area of the transverse conveyor 31. Connected to the lower edge of the casing 32 there is a receiving blade 39, which may be formed partially or wholly elastic. For instance a rubber lip 40 is provided on the free end of the receiving blade 39. But it is also possible to form the receiving blade 39 as a rigid sheet metal part and to let it end with a safety margin above the bottom 2 of the basin. The casing 32 is provided with a spaced distance 41 to the surface of the bottom 2 in any case.

The casing 32 may be formed with a closed casing wall, except for the intake opening 38, which is provided in any case, facing the direction of rotation according to the arrow 42. It is advantageous, though, when the wall of the casing 32 facing away from the direction of rotation according to the arrow 42 is fashioned as a sieve area 43. In this respect the wall of the casing 32 has openings 44 in the region of the sieve area 43, which may be formed to be round holes or long-hole-like slits or such. The width of the slits is very small.

It can be seen from FIG. 14 that the round sewage treatment basin 1 need not have an elaborate center pillar. Merely a funnel 5 is provided.

Figure 17:
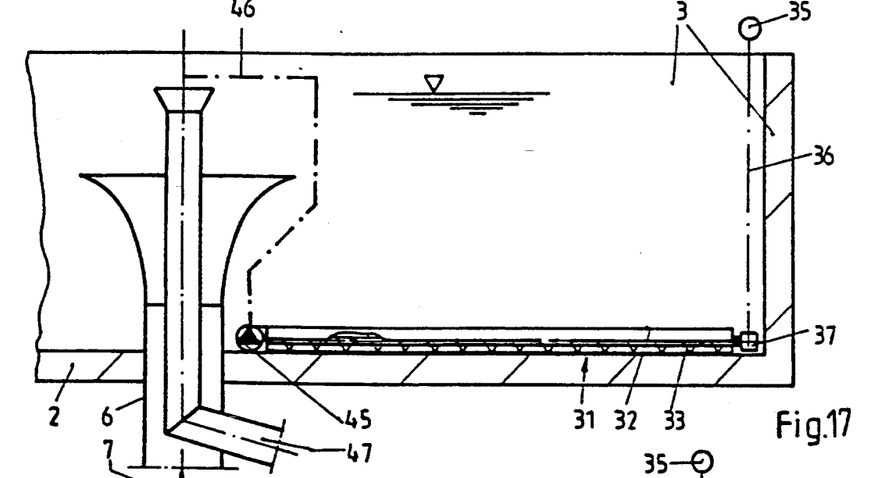

In the embodiment according to FIG. 17 a pump 45 is fitted to the inner end region, i. e. radially on the inside of the transverse conveyor 31, the pump 45 revolving together with the transverse conveyor 31 and the frame 10. The sludge taken up by the transverse conveyor 31 is directly transported into a discharge duct 47 by way of a pressure pipe 46 and then ducted away. A funnel 5 is not necessary here, which simplifies the construction of the round sewage treatment basin 1 in the area of the bottom 2 of the basin.

Figure 18:
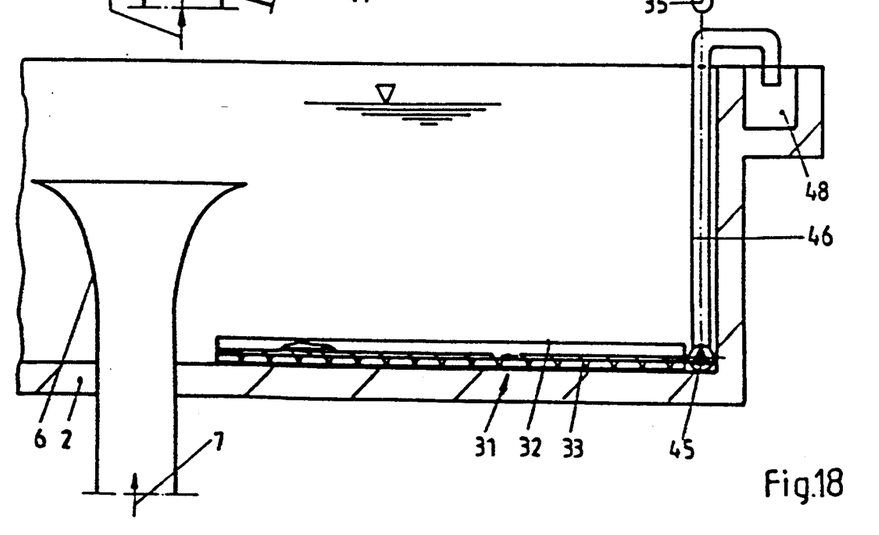

In the embodiment according to FIG. 18 the transverse conveyor 31 does not transport radially towards the inside, but radially towards the outside. The pump 45 and the pressure pipe 46 are correspondingly arranged at the radially outside end. They are positioned next to the motor 35 and the shaft 36. Surrounding the wall 3 of the basin a channel 48 is provided, which takes over the sludge from the pressure pipe 46 and from which the further transport of the sludge happens. It can be seen that the central area of the round sewage treatment basin is fashioned even simpler here. Only the inlet duct 6 is further provided.

While the foregoing specification and drawings disclose preferred embodiments of the invention, it will be understood by those skilled in the art that variations and modifications thereof can be made without departing from the spirit and scope of the invention as set forth in the following claims.

LIST OF REFERENCE NUMERALS

1—round sewage treatment basin
2—bottom
3—wall
4—center axis
5—funnel
6—inlet duct
7—arrow
8—rake blade
9—rubber lip
10—frame
11—toothed ring
12—driving pinion
13—shaft
14—bearing
15—motor
16—bearing
17—guide roller
18—profile
19—flange
20—flange wheel
21—arrow
22—vertical support
23—braces
24—guide roller
25—running wheel
26—suction cones
27—pump
28—pressure pipe
29—discharge duct
30—console
31—transverse conveyor
32—casing
33—conveyor helix
34—shaft
35—motor
36—shaft
37—transmission
38—intake opening
39—receiving blade
40—rubber lip
41—distance
42—arrow
43—sieve area
44—opening
45—pump
46—pressure pipe
47—discharge duct
48—channel

I claim:

1. An underwater clearing device for removing sludge from a circular sewage treatment and settlement basin, the basin being symmetrically formed about an upright axis, including a bottom wall formed concentrically about the axis, a sludge outlet opening formed in the bottom wall about the axis for passing sludge from the basin, at least one side wall extending upwardly from the bottom wall to form the basin, an inlet duct formed about the axis and extending upwardly through the bottom wall and the sludge outlet opening into the basin to supply sewage for treatment in the basin and to establish a water level formed by the sewage in the basin, comprising:

a frame positioned at a level normally below the water level in the basin;

blade means supported on the frame for moving settled sludge along the bottom wall of the basin for discharge from the basin through the sludge outlet opening, wherein said blade means is parallel to the bottom wall of the basin;

a ring formed concentrically about the axis, said ring being positioned at a level normally below the water level inside the basin;

said frame being connected at one of its ends to said ring and the other of its ends extending to a free end generally radially with respect to said sludge outlet opening;

drive means for rotating said frame about the axis of the basin to direct the sludge moved by the blade means for discharge from the basin;

support means for supporting said frame as said frame is rotated about the upright axis;

whereby said frame and the blade means rotate together about the axis to move and direct sludge that has settled on the bottom wall of the basin toward the sludge outlet opening for discharge from the basin.

2. The device of claim 1, wherein said frame comprises an elongated frame assembly parallel to the bottom wall of the basin, said frame assembly having a first end positioned toward the inlet duct and a second end positioned toward the basin side wall, said frame extending between the inlet duct and the side wall along a radial line emanating from the upright axis.

3. The device of claim 2, wherein said blade means comprises conveyor means carried on said frame adjacent the bottom wall of the basin for collecting and moving sludge for discharge from the basin, said conveyor means extending between the first and second ends of said frame assembly.

4. The device of claim 3, wherein said conveyor means is powered by said drive means for rotating said frame about the axis of the basin.

5. The device of claim 3, wherein said conveyor means further comprises drive means, said drive means including a motor and a transmission.

6. The device of claim 5, wherein said drive means is carried on the frame as it rotates about the axis of the basin.

7. The device of claim 3, wherein said conveyor means comprises a screw conveyor, said screw conveyor being carried in a casing formed as a section for a cylinder having an elongated intake opening defined therein along its length and facing toward the direction of the frame's rotation about the axis, said screw conveyor including flexible receiving blade means formed along the edge of said intake opening adjacent the bottom wall of the basin for directing sludge into said conveyor.

8. The device of claim 7, wherein said conveyor casing is formed as a sieve for filtering water out of the sludge as it is moved within said conveyor, said sieve having a plurality of openings defined therein of a width no greater than 0.5 mm.

9. The device of claim 3, wherein said conveyor means comprises means to pump the sludge collected by the conveyor means out of the basin, said means comprising a pump supported on said frame and rotating with the frame about the upright axis of the basin.

10. The device of claim 9, wherein said conveyor means moves the sludge collected by the conveyor means away from the side wall and toward the upright axis of the basin 11. The device of claim 9, wherein said conveyor means moves the sludge collected by the conveyor means away from the upright axis and toward the basin side wall.

12. The device of claim 2, wherein the second end of the frame is rigidly fastened to said ring, and said frame and said ring rotate together about the upright axis of the basin.

13. The device of claim 2, wherein the second end of the frame is rigidly fastened to said ring, and said frame and said ring rotate together about the upright axis of the basin.

14. The device of claim 2, wherein said ring is fixed in position within the basin, and said frame moves along the rail as the frame rotates about the upright axis of the basin.

15. The device of claim 1, wherein said blade means comprises an elongated metal blade, said blade having flexible lip means formed along the edge of the blade adjacent the bottom wall of the tank for moving settled sludge along the bottom wall of the basin.

16. The device of claim 15, wherein said blade means comprises a plurality of blades, each blade being parallel to one another and angled with respect to the frame and into the direction of rotation for moving the sludge toward the sludge outlet opening formed in the bottom wall of the basin.

17. The device of claim 1, wherein said drive means comprise a motor, a shaft connected to the motor, and a geared driving pinion mounted on the shaft and engaged in driving relationship with said ring.

18. The device of claim 17, wherein said drive means is carried on said frame assembly.

19. The device of claim 17, wherein said motor of said drive means is located in a fixed position along the basin side wall with respect to said ring.

20. The device of claim 1 wherein said support means comprises a rail formed concentrically about the upright axis, said rail being fixed in position with respect to said ring, a plurality of flanged wheels mounted on said frame assembly, each of said flanged wheels riding on said rail, and guide bearing means for supporting and guiding said frame and said toothed ring.

* * * * *